United States Patent [19]
Ross

[11] Patent Number: 5,465,213
[45] Date of Patent: Nov. 7, 1995

[54] SYSTEM AND METHOD OF MANUFACTURING A SINGLE BOOK COPY

[76] Inventor: Harvey M. Ross, 787 Cross Creek Dr., St. Louis, Mo. 63141

[21] Appl. No.: 90,417

[22] Filed: Jul. 12, 1993

Related U.S. Application Data

[63] Continuation-in-part of Ser. No. 558,759, Jul. 27, 1990, abandoned.

[51] Int. Cl.[6] ................................................ G06F 19/00
[52] U.S. Cl. .......................... 364/468; 364/401; 270/54; 412/13
[58] Field of Search ................................. 364/478, 401, 364/402, 403, DIG. 1, DIG. 2; 395/101, 103, 155; 281/15.1; 283/63.1, 67, 117; 412/11–13; 270/54

[56] References Cited

U.S. PATENT DOCUMENTS

| | | | |
|---|---|---|---|
| 3,575,501 | 4/1971 | Rosenberg | 355/210 |
| 3,892,427 | 7/1975 | Kraynak et al. | 270/12 |
| 4,121,818 | 10/1978 | Riley et al. | 364/478 X |
| 4,528,643 | 7/1985 | Freeny, Jr. | 364/900 |
| 4,616,327 | 10/1986 | Rosewarne et al. | 364/400 |
| 4,654,799 | 3/1987 | Ogaki et al. | 364/479 |
| 4,674,055 | 6/1987 | Ogaki et al. | 364/479 |
| 4,725,977 | 2/1988 | Izumi et al. | 364/479 |
| 4,768,766 | 9/1988 | Berger et al. | 364/478 |
| 4,787,050 | 11/1988 | Suzuki | 364/479 |
| 4,839,829 | 6/1989 | Freedman | 395/155 |
| 4,900,001 | 2/1990 | Lapeyre | 270/1.1 |
| 4,903,139 | 2/1990 | Minter | 358/296 |
| 5,036,472 | 7/1991 | Buckley et al. | 364/479 |
| 5,144,562 | 9/1992 | Stikkelorum et al. | 364/478 |

*Primary Examiner*—Joseph Ruggiero
*Attorney, Agent, or Firm*—Polster, Lieder, Woodruff & Lucchesi

[57] ABSTRACT

A computer based book manufacturing, distributing and retailing system for the high speed reproduction of a single copy of a book is disclosed. The system is especially adapted for direct consumer sales since the manufacture of a selected book can take place at the point of sale. A master module includes a computer having a database of books to be selected, the books preferably being stored in a digital book-description format. Upon selection of a particular book from the database, a single copy of the book (including the text and a color cover) is printed by means of high speed raster printing engines. The system includes a binder for binding the text pages and the cover into a book.

8 Claims, 5 Drawing Sheets

BOOK DESCRIPTION FORMAT

BOOK ATTRIBUTES DESCRIPTION

1) Title
2) ISBN Number
3) Classification
4) Abstract
5) Author
   a) Number of Authors
   b) 1st Author
   c) 2nd Author
   d)
   e) Nth Author
6) Editor
   a) Number of Editors
   b) 1st Editor
   c) 2nd Editor
   d)
   e) Nth Editor
7) Subject
   a) Number of Subjects
   b) 1st Subject
   c) 2nd Subject
   d)
   e) Nth Subject
8) Keyword
   a) Number of Keywords
   b) 1st Keyword
   c) 2nd Keyword
   d)
   e) Nth Keyword
9) Publisher
   a) Number of Publishers
   b) 1st Publisher
   c) 2nd Publisher
   d)
   e) Nth Publisher
10) Date of Publication
    a) Number of Publication Dates
    b) Date of 1st Publication
    c) Date of 2nd Publication
    d)
    e) Date of Nth Publication
11) Date of Copyright
    a) Number of Copyright Dates
    b) Date of 1st Copyright
    c) Date of 2nd Copyright
    d)
    e) Date of Nth Copyright

BOOK CONTENTS DESCRIPTION

1) Cover Key
2) Book Body Key
3) Section & Chapters
   a) Number of Chapters
   b) Number of Sections
   c) Chapters in Section 1
   d) Chapters in Section 2
   e)
   f) Chapters in Section N
4) Position of Page Number
5) Title Section
   a) Number of Pages
   b) Starting Page Number
   c) Starting Right/Left
6) Preface
   a) Number of Pages
   b) Starting Page Number
   c) Starting Right/Left
7) Forward
   a) Number of Pages
   b) Starting Page Number
   c) Starting Right/Left
8) Acknowledgments
   a) Number of Pages
   b) Starting Page Number
   c) Starting Right/Left
9) Table of Contents
   a) Number of Pages
   b) Starting Page Number
   c) Starting Right/Left
10) Introduction
    a) Number of Pages
    b) Starting Page Number
    c) Starting Right/Left
11) Section 1
    a) Number of Pages
    b) Starting Page Number
    c) Starting Right/Left
12) Section 2
13)
14) Section N
15) Chapter 1
    a) Number of Pages
    b) Starting Page Number
    c) Starting Right/Left
16) Chapter 2
17)
18) Chapter N
19) Addendum
    a) Number of Pages
    b) Starting Page Number
    c) Starting Right/Left
20) Bibliography
    a) Number of Pages
    b) Starting Page Number
    c) Starting Right/Left
21) Appendices
    a) Number of Appendices
    b) Appendix 1
       1) Number of Pages
       2) Starting Page Number
       3) Starting Right/Left
    c) Appendix 2 Key
    d)
    e) Appendix N Key
22) Index
    a) Number of Pages
    b) Starting Page Number
    c) Starting Right/Left
23) Notes
    a) Number of Pages
    b) Starting Page Number
    c) Starting Right/Left

BOOK CONTENTS
1) Cover
2) Book Body
   (Body of N Physical Pages)

FIG. 5

SYSTEM AND METHOD OF MANUFACTURING A SINGLE BOOK COPY

CROSS-REFERENCE TO A RELATED APPLICATION

This is a continuation-in-part application of U.S. patent application Ser. No. 558,759 filed Jul. 27, 1990, now abandoned.

BACKGROUND OF THE INVENTION

This invention relates to the field of book distribution, storage, manufacturing and retailing. However, while most book manufacturing is accomplished by the production of a large quantity of copies of the same book at one time in a factory setting, the present invention involves a computer-based system for the high speed reproduction of a single copy of a selected book, preferably at the consumer point of purchase.

The distribution of books to consumers is usually accomplished through retail stores and mail order catalogue concerns which purchase multiple copies of thousands of different book titles for resale. In a typical retail book store, the major expenses of doing business are rental of retail store space, employee wages and benefits, and inventory maintenance costs including interest on loans and economic losses created by shoplifting, employee pilferage, damage to inventory from customer handling and those costs incurred by unwanted unsaleable inventory. Further costs include those of physically shipping and handling of books from the manufacturer to the retail store. The retail store owner must always attempt the impossible task of accurately predicting future demand for the myriad of books on the market; while the consumer may be frustrated in trying to find a particular book which because of its age or the nature of its subject matter does not provide enough public demand for the retailer to invest his money or space to carry the book in inventory. A system of ordering such books is available through retail stores; however, the customer must wait usually days to procure a book by this method and sometimes the book may not even be in print and thus unavailable.

Similar problems which exist in the retail sales of records and tapes were addressed in U.S. Pat. No. 4,811,325 where a system is disclosed for producing a customized sound recording in a retail environment while the customer waits. While the problems which exist regarding the retailing of sound recordings are similar to those regarding books, the subject matter of the cited patent does not lend itself to improving the above-identified difficulties relating to the sales of books.

SUMMARY OF THE INVENTION

The present invention comprises a computer based book manufacturing system for the high speed reproduction of a single copy of a book. The system may be utilized in many environments, but it is especially well suited for direct retail consumer sales. The system includes the capability of computer storage of tens of thousands of different books, both the printed text and color graphic cover thereof, along with both textual and color pictorial promotional sales information regarding each of the stored books. A customer module (e.g., a customer kiosk) permits the consumer to access the promotional sales information on a display screen which may include general information such as a list of best sellers or specific information (e.g., a sample chapter) about individual books in which the consumer may have some interest. Such promotional information may include a graphical simulation of the book, descriptive information provided by the publisher, as well as a synopsis and critique of the book by a book reviewer presented in full motion video and stereo sound. The consumer may browse through the introduction, abstracts or selected pages of the book on the computer module screen. If the consumer wishes to purchase a book, he may either pay for the book through a store clerk who will command the system to manufacture a single copy of the book; or the consumer may enter his credit card into the system, and after the purchase transaction is automatically approved and logged through the public telephone network, the system will automatically initiate production of the book.

Upon command, the customer module (or other order placing means) will request a computer in a master module to retrieve the text data from its memory and command the high speed printing of the text pages of the book, preferably precisely in the same format as the original publishers printing. At the same time, the computer retrieves the color graphic data from computer storage for printing of the book cover on a color printer. After printing, the printed pages are automatically transferred first to an optional jogger table for alignment of the text pages, then to an optional paper cutter for cutting the pages down to the proper size for the particular book, next to an automatic thermal binding machine where the text pages are bound into the color book cover. Of course, the pages could be cut prior to alignment if desired. Lastly, the finished book is conveyed to a pick-up tray where the customer has been awaiting the arrival of his book for about three to five minutes.

The present invention may aid in the operation of, for example, public libraries. At present, public libraries must utilize large, expensive buildings to house a vast multitude of costly books, a great number of which are rarely read by the library's constituency. The high speed manufacturing system of the present invention could provide computer browsing capabilities for library users and facilitate physical delivery of a particular book to the user for check-out in an overall cheaper scheme than conventional library systems. Advantages become readily apparent when the manufacturing system of the present invention is placed in a university book store environment. For example, the machine could produce only the boob necessary for the number of students enrolled in a particular class and only those books which the professor has designated for the particular course. As these factors are quickly changeable, the present invention could efficiently provide the correct books and precisely the quantity necessary in an efficient, cost-effective manner.

Also, it is contemplated that systems located in different stores and University libraries could provide further library texts to each other through telephone communication thereby expanding the number of titles available to an even greater extent.

The floor space required for the book manufacturing system according to the invention is somewhat larger than an ordinary office desk plus a computer customer console for each customer sales location or booth; about thirty square feet of floor space. It is contemplated that one to four such customer consoles would be desirable.

Briefly stated, the present invention is a book manufacturing system comprising a main module having computer means for storing and selectively retrieving data corresponding to the text of and information concerning a plurality of books in a digital book-description format. The system includes means for selecting one of the books, and means for printing the book by means of a high-speed raster printing engine. It will be understood, however, that a rasterized image processor could be used to produce raster images from other formats, such as Adobe's Postscript. The system includes means for binding the pages into a book.

It is therefore an object of the invention to provide a book manufacturing system which is capable of storing data corresponding to the text and color graphical cover of tens of thousands of different books, as well as promotional sales text and color graphics for aiding the consumer in choosing a book for purchase, and facilitate the high speed manufacture of a single copy of a selected book on the immediate premises while the customer waits for a very short time.

It is another object of the invention to provide a system which alleviates or even eliminates the problems set forth above associated with the need to purchase and hold a large inventory of books for a retail store or mail order catalogue concern, to reduce floor space requirements, to provide for reduction of the number of employees needed to run a retail book store, to provide for the reduction of shoplifting costs, employee pilferage costs, damage to inventory and dead inventory costs as well as shipping costs associated with the operation of a retail book store.

It is another object of the invention to permit a user to select portions of different books or other publications, to print these selected portions and to bind these selected portions in a single book form in a timely and cost effective manner.

It is still a further object of this invention to enable the reproduction and binding of a book in an economical and efficient manner.

It is a further object of the invention to provide a system which enhances the consumer's chances of finding and procuring a book which may not otherwise be available.

These as well as other objects and advantages of the present invention will become more apparent upon a reading of the following description of a preferred embodiment thereof.

BRIEF DESCRIPTION OF THE DRAWINGS

In the drawings:

FIG. 3 is a diagrammatic and block diagram view of a second and now preferred embodiment of the book storage, selection and manufacturing system of the present invention including a master module and optional customer modules(s) linked to the master module via a wireless LAN network or the like;

FIG. 5 is a listing to the book description format of the present invention.

Corresponding reference characters depict corresponding parts throughout the several view of the drawings.

DESCRIPTION OF PREFERRED
EMBODIMENTS

Figure 1:
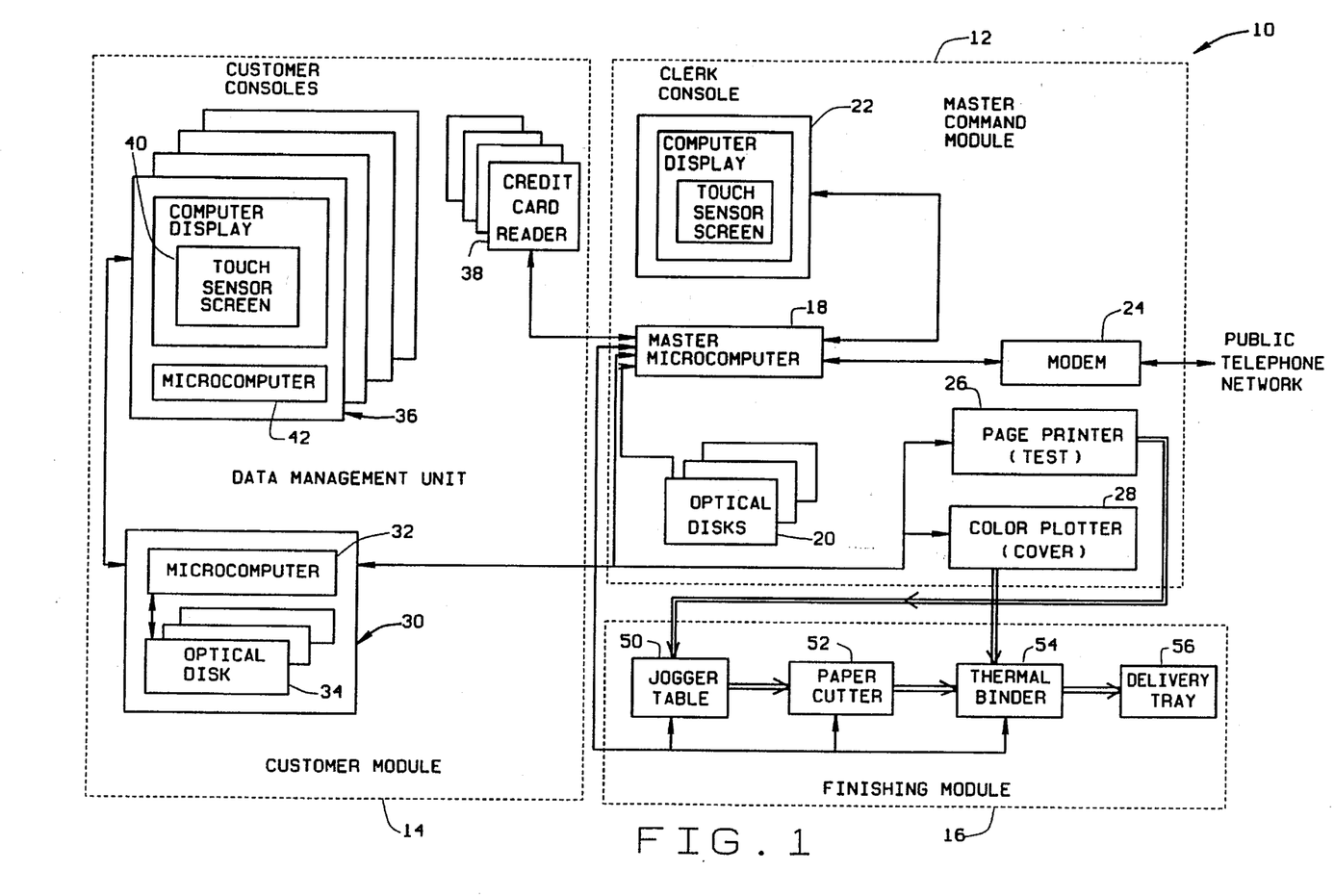
FIG. 1 is a system block diagram of a first embodiment of a single copy, high speed book manufacturing system according to the present invention.
Figure 2:
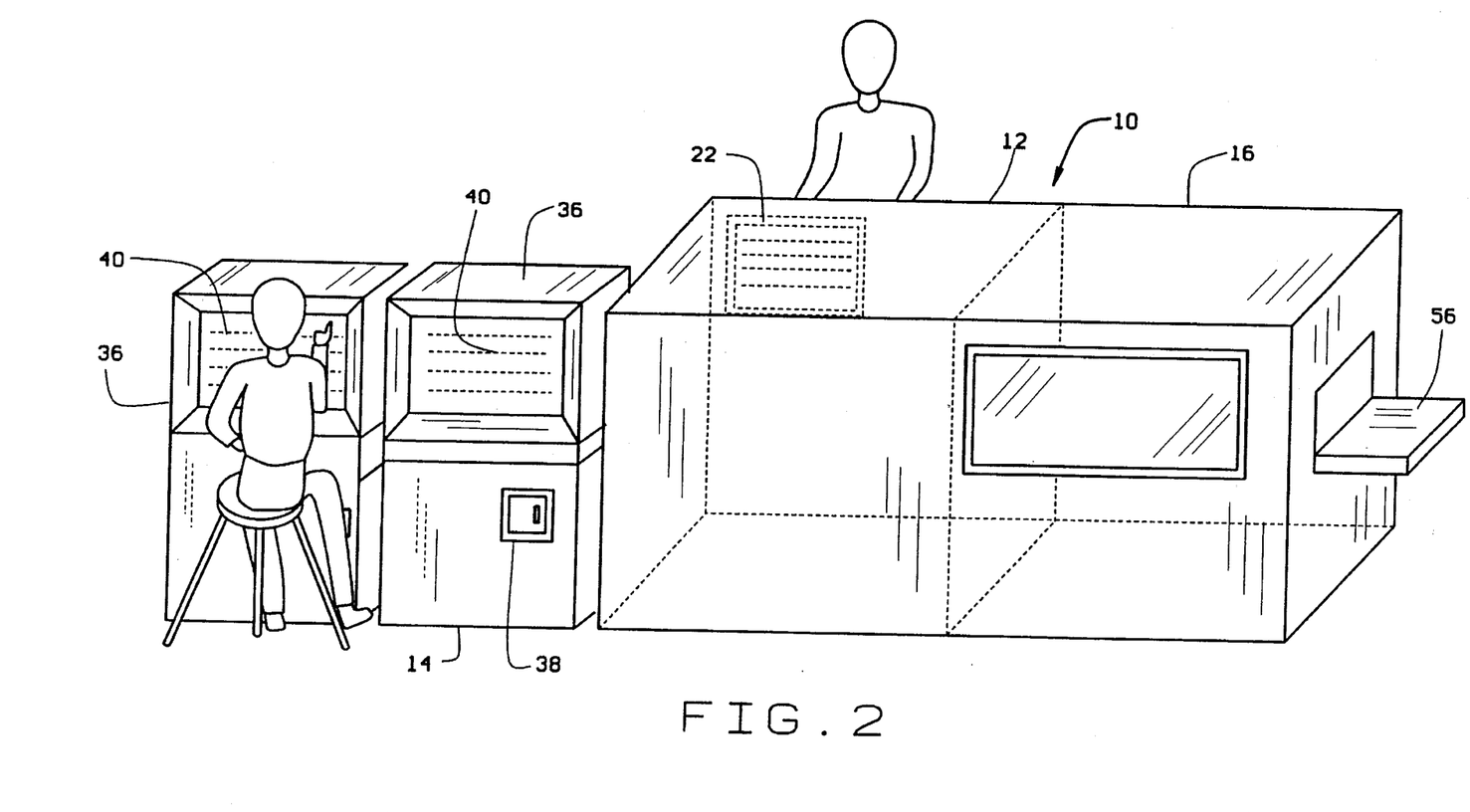
FIG. 2 is a semi-schematic representation of the physical design of the embodiment of the invention shown in FIG. 1.

With reference to the drawings, there is shown a first embodiment of a book manufacturing system according to the principles of the present invention. While FIG. 1 shows in diagrammatic form the flow of information and materials through the system, and FIG. 2 shows a schematic representation of the physical nature of the system, like reference characters will indicate like features of the invention in both of the figures, wherein a first embodiment of the book manufacturing system of the present invention is represented generally by the numeral 10.

System 10 is comprised of three main subsystems, viz., the master command module 12, the customer module 14 and the finishing module 16.

Master command module 12 is comprised of a master microcomputer 18 equipped with an integral hard magnetic disk drive of preferably not less than 40 Mbytes for the storage of application software, utility software and diagnostic software. Master microcomputer 18 also preferably includes an integral drive for 1.44 Mbytes, 3.5" magnetic diskettes employed for running these programs, including the loading and maintenance of the text of the books to be included in the book machine library. Controllers are provide for the integral disk drives. Optical disk drives 20 are provided in communication with master microcomputer 18.

Optical disk drives 20 preferably includes a multiple of optical storage disks that employ ISO—standard 5.25" optical cartridges with a storage capacity (formatted) of not less than 650 Mbytes per cartridge, and a data transfer rate of not less than 700 Mbytes per second for the storage of machine library titles, text, promotional descriptive data and cover color graphics. In accordance with this invention, other storage media and retrieval systems may be used.

Also in communication with microcomputer 18 is a clerk console display screen 22 which is provided with both computer display and touch sensor screen capabilities. Clerk console 22 preferably includes a computer screen with a diagonal receiving measurement of not less than 12" and a display resolution of 640×350 picture elements (pixels). The touch sensor integrated with the clerk computer screen has a resolution of not less than 1 part in 1024 and a diagonal measurement of not less than 12".

Master microcomputer 18 may transmit and receive data transmissions via modem 24 through the public telephone network to receive data corresponding to the text and cover graphics of an additional book or books not yet in the machine library. Further, credit card transactions can automatically and instantly be consummated and recorded through the telephone network as is well known in the art.

Master microcomputer 18 also communicates with a page printer 26 and a color printer/plotter 28. Page printer 26 is comprised of a number of non-impact laser printers capable of printing, upon command by microcomputer 18, on both sides of paper loaded therein, the entire text of a book to produce the paper pages thereof. The use of multiple low speed printers allows the machine to accomplish its task in the event that one printer should fail during the printing process. The page printer 26 preferably provides a resolution of not less than 0.085 mm, a printing speed of not less than 20 duplex impressions per minute.

Color printer/plotter 28 is adapted to produce a pictorial color cover upon command by microcomputer 18, and is comprised preferably of a multiple color printer/plotter with a dot resolution of 0.085 mm., on paper, vellum and poly film; and includes a parallel data interface.

Customer module 14 includes a data management unit 30 being provided with a microcomputer 32 and a plurality of optical disk drives 34 in communication therewith, preferably one to four customer consoles 36 and a credit card reader 38 for each console. Microcomputer 32 is equipped with an integral hard magnetic disk drive preferably of not less than about 40 Mbytes for the storage of application software and customer assistance text; an integral drive, for example, for 3.5", 1.44 Mbytes magnetic diskettes for application program loading and data backup functions; controllers for the integral disk drives; a controller for the optical disk drives 34; and communications interfaces with master control module 12 and customer consoles 36. Optical disk drives 34 are erasable and employ ISO-standard 5.25" optical cartridges with a storage capacity (formatted) of not less than 650 Mbytes per cartridge, and a data transfer rate of 700 KBytes per second for the storage of library indexes, library titles, color graphic data and promotional sales descriptive data.

Customer consoles 36 are preferably provided with a customer seat and an ambient light level suitable for viewing the color computer monitor screen 40. Color computer monitor screen 40 is preferably not less than 14" of diagonal viewing area with a maximum resolution of 1024×768 pixels, and includes a touch sensor integrated with the monitor having a resolution of 1 part in 1024 and a diagonal measurement of not less than 14". Each customer console 36 also includes a microcomputer 42 which includes controllers for the color screen monitor 40 and the touch sensor therewith, an interface with the data management unit 30 and a memory unit in which resides the customer application software.

Finishing module 16 includes a jogger table 50 for aligning the paper pages stack, a parallel paper cutter 52 for cutting the text paper pages into the required size for any particular book in the machine library, a thermal binder 54 for binding the text pages together with a spine and the color cover there around, and a delivery tray 56 to which the finished book is conveyed for pick-up by the customer.

The application software for the master microcomputer 18 which resides in the integral hard magnetic disk creates labeled touch pads on the clerk console screen, identifies and locates the coordinates of a finger pressure on the touch sensor of clerk console 22 and translates the coordinates into commands that provide for (a) adding new book titles, text and descriptive material data to the optical disks 20 and transferring subsets of this data to the customer module data management unit microcomputer 32 for transfer to the data management storage disks 34; (b) executing and summarizing purchase transactions from credit card reader 38 or clerk console 22 and preparing periodic reports; (c) generating daily reports for publisher royalties; and (d) conducting system health diagnostics on all active elements of the system and displaying the results of these checks on the clerk's console screen.

The application software for the data management unit microcomputer 32 provides for (a) the receipt and execution of commands received from customer console microcomputer 42; (b) the retrieval of book titles, graphics and descriptive data from storage in optical disks 20 in response to commands, and the transfer of same to optical disk 34; (c) the transfer of purchase commands to master microcomputer 18; and (d) the execution of diagnostic commands and the transfer of system messages to master microcomputer 18.

The application software for the customer console microcomputer 42, (a) creates labeled touch pads on customer console computer screen 40; (b) identifies and locates the coordinates of a finger pressure on the touch sensor and translates the coordinates into customer commands; (c) transfers commands to data management unit microcomputer 32 and receives commands and data, such as book lists, book text, sales promotional information and graphics, etc., and (d) interprets commands and displays information on color computer display 40.

OPERATION

Book manufacturing system 10 employs three major steps for operation: (a) Initial preparation and storage of source data; (b) process for customer browsing and purchase selection; and (c) physical printing and assembly of selected book.

DATA PREPARATION

The book data that is employed by the system is comprised of three elements: (a) the textual contents of the book, (i.e., text pages, index page, table of contents, Library of Congress notice, fly sheets, etc.); (b) descriptive material such as a synopsis, plot outline, author's biographical summary, etc., (i.e., those textual materials that are promotional in nature); and (c) color cover graphics.

The source of this data will usually be the publisher of the book, and each book is first translated from its source media to a specified format for recording on 3.5", 1.44 Mbytes diskettes. One diskette stores up to 450 pages of textual material. A companion diskette stores cover graphics data in a compressed format and a minimum of 10 pages of descriptive text.

The system employs optical storage cartridges 20 as its data source, and initially the library of books that the publisher or system owner wishes to be made available to the system must be transferred from magnetic to optical media. This is accomplished by employing stand alone subsets of the master control module hardware and software to read/verify the diskette data, compress the textual and graphics data, and write/verify the optical data. Each optical storage cartridge has the capability of storing up to 1,140 sets of textual, graphics and descriptive data; there are built-in provisions for up to five (5) additional optical disk drives to be installed thus providing an on-line book capacity of 7,840 books. The total system capacity is limited only by the number of optical disks required for a given store. The additional optical disk would require operator loading.

Additions to the existing storage library are shipped to system owners via magnetic media or, alternatively, over the telephone modem, and transferred to the appropriate optical storage cartridge by the master control module utility program.

When updating by magnetic media in the form of two diskettes, the clerk touches a 'manual update' command block displayed on the clerk's console screen 22. The utility program then causes data to be displayed instructing the clerk as to which optical disk cartridge to load into disk drive 20, the order in which the diskettes are to be loaded, and the command blocks to be touched in order to verify the integrity of the data transfer from each diskette. Software interlocks ensure the correct sequencing of commands and maintain the integrity of the stored data. The diskettes can be retained for backup purposes.

In the event that updates are transferred via telephone modem 24, the utility program routes each update transfer block (2.88 Mbytes) to an area of the integral hard magnetic disk in microcomputer 18 specifically reserved for this function. The utility program then causes data to be displayed instructing the clerk as to which optical disk cartridge to load into optical drive 20 and the command blocks to be touched in order to verify the integrity of the data transferred from the hard disk, it is compressed and transferred to the optical disk. Following transfer to the optical disk, the clerk will be instructed via the computer screen 22 to insert two blank diskettes (for data backup recording purposes) in a specific sequence and to actuate labeled command blocks when each block transfer is complete. Software interlocks ensure the correct sequencing of commands and maintain the integrity of the stored data. This sequence is repeated for all data that was transferred via the modem, following which the reserved area of the hard disk is erased upon initial system loading of the library cartridges 20 and of subsequent additions, utility software in the master microcomputer 18 creates an index by author and title of all books available in the system, and copies the descriptive material of each book, together with a low-resolution subset of its cover graphics to the optical storage unit 34 of the data management unit 30 of customer module 14, to provide a graphic and descriptive index of not less than about 4000 books per cartridge drive. There can be built-in provisions for a total of up to six drives to be installed, providing a total capacity of customer review material of about 24,000 books per system.

CUSTOMER SELECTION

All customer actions are conducted within customer console 36. The customer seats him or herself in front of computer screen 40 which initially displays a preprogrammed graphics and text message selected by the system owner and invites the customer to touch any part of the screen to initiate the dialogue. For all subsequent customer/system interchanges, the screen will display a series of labeled vertically-oriented command boxes on the right side of the screen, with requested data and graphics being presented in the remaining area of the screen. A "help" command block will be present on each transaction screen to assist the customer in accessing the system, and all text display formats include a touch 'dragging' feature that enables the customer to browse forward and backward through the displayed text at his own pace. A visual feedback is made to each touch and a double tap will "undo" the selection. The transactions available to the customer include, but are not limited to: (a) display of current best sellers, with selection resulting in a display of the book; (b) searching by title or author, with selection resulting in a display of the book; (c) browsing through descriptive material provided by the publisher; (d) making another selection; and (e) requesting purchase of a book.

Each customer console 36 is a stand alone unit with local storage and is a node on a high-speed data network for access to the data management unit 30 for graphic and descriptive data and for requesting a purchase. Application software within data management unit 30 retrieves the graphic or descriptive data requested by a customer console, decompresses the data and routes the data to the requester. Library integrity is maintained by operating the optical storage unit in a read-only mode and by the interlocking of command software such that only logical command sequences are accepted.

Following a purchase command, the customer is advised of the waiting time for delivery of the finished book which usually will be three to five minutes. Applications software maintains track of printing status and advises individual customer consoles of the expected time of book delivery.

PRODUCT DELIVERY

A purchase request from customer module 14 results in the clerk being notified by a screen message of the optical storage cartridge to be loaded. This loading may be accomplished automatically within the master command module 12 or manually by the clerk. Following this action, the clerk may be requested to verify the status of printer 26 in terms of paper availability, toner levels, etc., and to load the book cover material into color printer/plotter 28. It is contemplated that this step may also be accomplished fully automatically. Upon cash payment by the customer at the clerks station, or upon credit card payment and verification through credit card reader 38, printing and plotting are initiated.

The applications software resident in the master command microcomputer 18 accepts a purchase command from the customer module, checks printer status and returns a message to the requester of anticipated delivery time. The purchase command includes title data that is used to format a display to the clerk's screen identifying the optical cartridge to be mounted either automatically or manually. Data is then retrieved from optical disk 20, data is decompressed and routed to printer/plotter 28, and text data is decompressed, ordered and formatted for double page/double side printing and routed to printer 26.

On completion of the printing/plotting operation master microcomputer 18 is signaled and it commands a conveyor to transfer the collated stack of paper text pages to jogger table 50 to achieve paper alignment, then to paper cutter 52 for reduction of the size of the paper to the desired dimension for the particular book and thence on to thermal binder 54 where the paper stack is clamped. The finished cover sheet is transferred from printer/plotter 28 to binder 54 where a binding spine is carried across a glue cylinder to the paper pages and the cover sheet is creased around the pages and the spine to achieve a finished book. The book is then conveyed out of finishing module 16 via delivery tray 56 for pickup by the customer.

Within the broader aspects of this invention, those skilled in the art will recognize that, depending on the type of printing operation and blank paper used, the above-described jogging and paper trimming operations may not be required.

The computer-related hardware components of the present invention are readily available. In order to aid one of ordinary skill in the art in the production and practice of the novel system, the following list of specific possible hardware components is provided; however, it should be understood that the list provides only examples of available hardware, and the characteristics of the particular hardware cited do not limit the scope of the present invention.

CUSTOMER MODULE (14)

Customer Console (36)

Computer Display (40)—16" 1280×1024 pixel high resolution video monitor similar to a Mitsubishi 16L Diamond Scan, equipped with a touch screen similar to an Elographics AccuTouch resistive sensor.

Microcomputer (42)—Intel 286-based microprocessor configured as a diskless node on a LAN network with 4 megabytes of high speed random access memory, a CVGA graphics adapter card and a touch screen serial controller similar to a CompuAdd model 64772 212w Arcnet-linked diskless workstation with 4 megabyte option and an Elographics 274-150 RS232 controller card.

Data Management Unit (30)

Microcomputer (32)—Intel 386-based 25 MHz microprocessor configured with 16 megabytes of RAM memory, an Intel 80387-25 math coprocessor, an 80 megabyte (19 millisecond access) hard disk drive, a 1.44 megabyte diskette drive, dual disk controllers, LAN network controller card and optical disk controller cards similar to CompuAdd model 64837 with 16 megabyte option, 80837-25 coprocessor option, Arcnet 8-port active hub, and optical disk controller card(s).

Optical Disks (34)—ISO-standard read/write option storage system expandable in 650/1300 megabyte storage increments similar to the Alphatronix Inspire model IPA20-D.

MASTER COMMAND MODULE (12)

Clerk Console (22)—14" 640×350 pixel medium-resolution monochrome video monitor similar to a Mitsubishi Diamond Scan, equipped with a touch screen similar to an Elographics AccuTouch resistive sensor.

Master Microcomputer (18)—Intel 386-based 25 MHz microprocessor configured as a LAN network node, with 16 megabytes of RAM memory, an Intel 80387-25 math coprocessor, a 320 megabyte (18 millisecond access) hard disk drive, a 1.44 megabyte diskette drive, dual disk controllers, LAM network controller card and optical disk controller cards similar to CompuAdd model 64839 with 16 megabyte option, 80837-25 coprocessor option. Arcnet 8-port passive hub, printer controller, color printer/plotter controller, Modem (24)—Bell 212, CCITT V.32 compatible full duplex 9600 baud add-in modem similar to Black Box Model TK-MD909-C and optical disk controller card(s).

Optical Disks (20)—ISO-standard read/write optical storage system expandable in 650/1300 megabyte storage increments similar to the Alphatronix Inspire model IPA20-D.

Page Printer (26)—one or more Adobe PostScript compatible laser printers with duplex printer capabilities configured to provide an aggregate printing rate of not less than 20 impressions/minute similar to 3 or more Hewlett-Packard LaserJet Series IID, Color Printer/Plotter (28)—300 dpi, 8 color pen printer/plotter similar to Hewlett-Packard 7475A, or alternative Toyo TPG 4300 full color video printer.

FINISHING MODULE (16)

Thermal Binder (54)—semiautomatic binding machine employing the hot glue process and incorporating jogging, clamping, cover sheet forming and gluing mechanisms similar to the PLANAX Autotherm IIIS.

Figure 3:
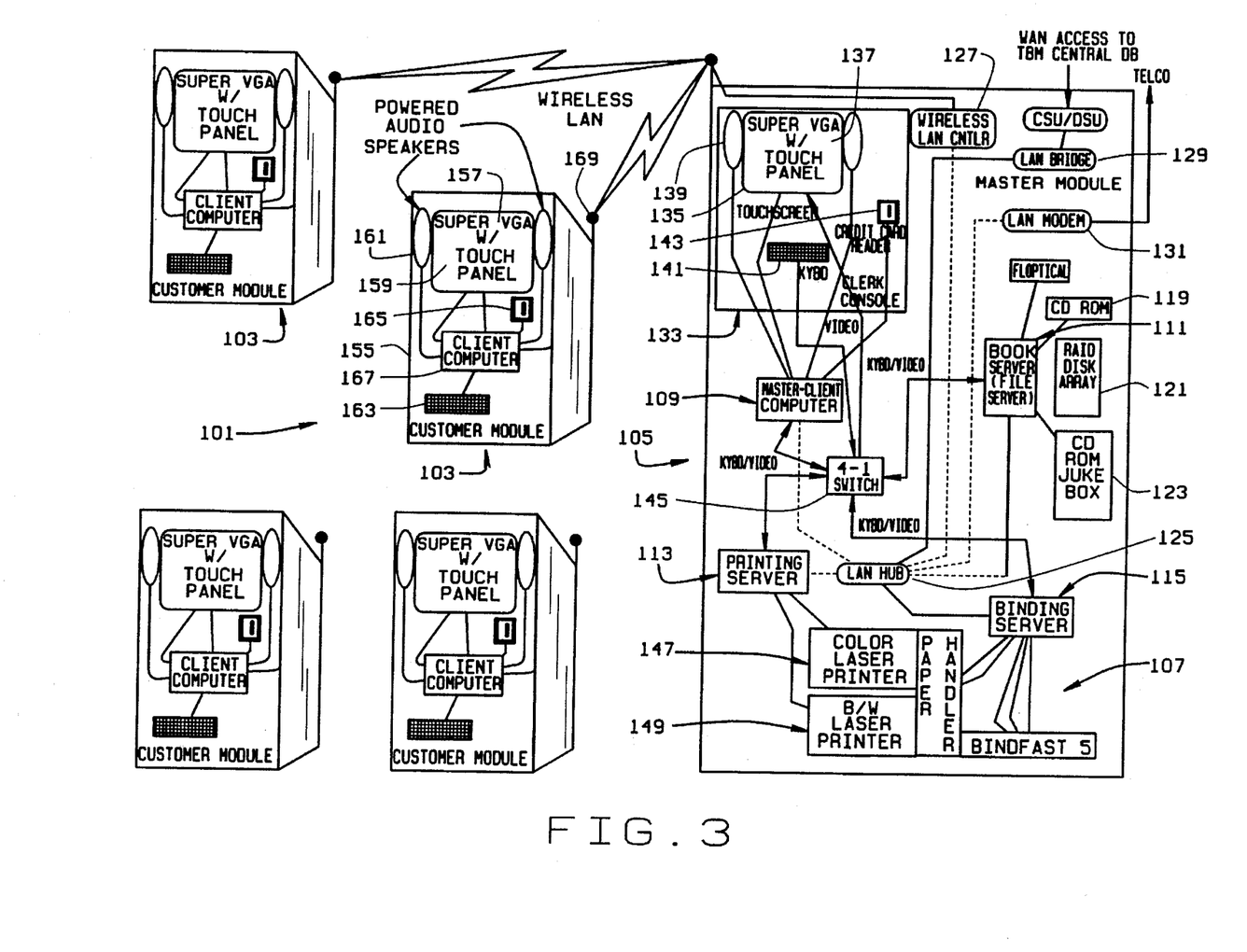
Figure 4:
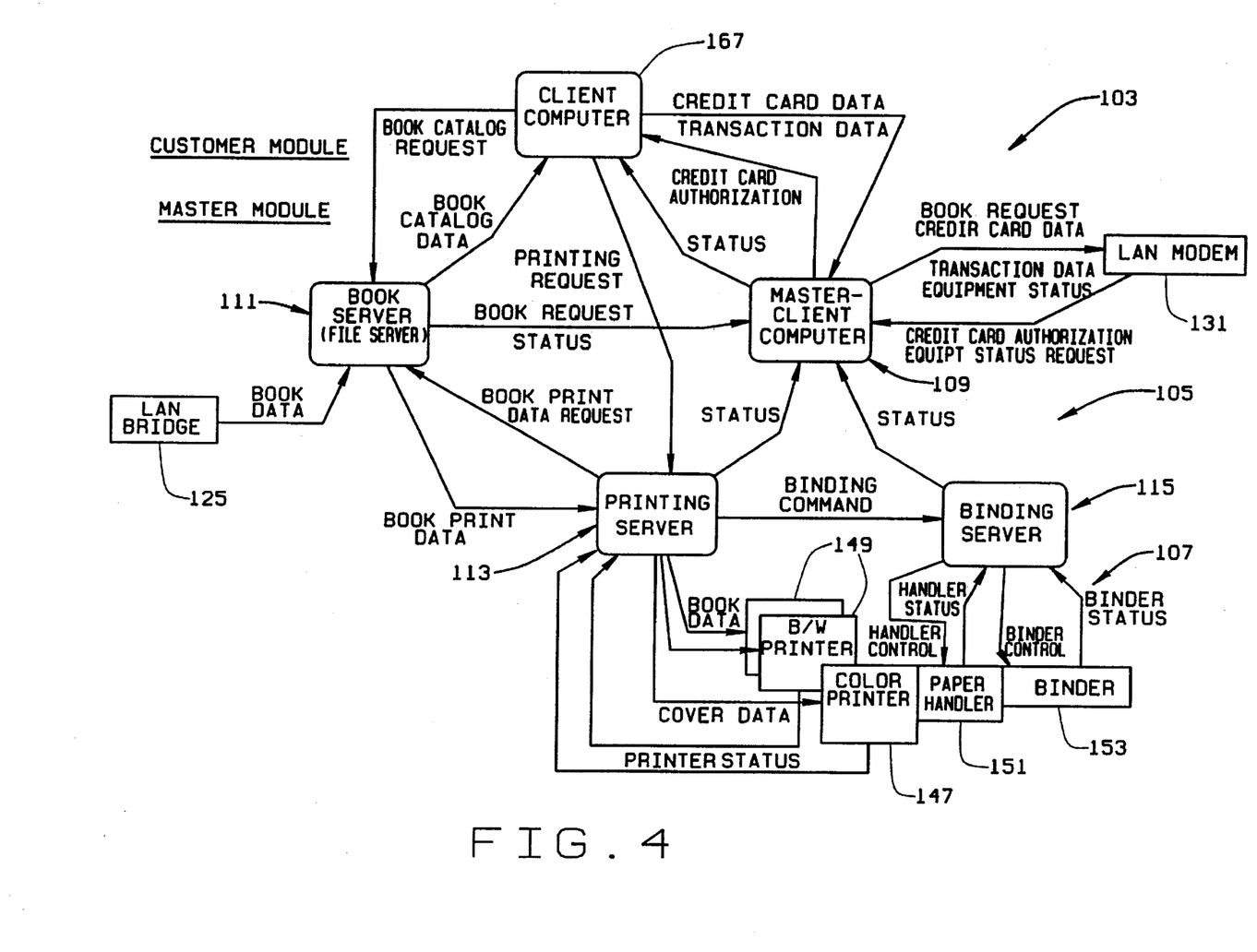
FIG. 4 is a data flow diagram of the master module and the customer module of the system depicted in FIG. 3.

Referring now to FIGS. 3 and 4, a second and now preferred embodiment of the computer based book storage, selection, printing and binding system of the present invention is indicated in its entirety by reference character 101. In general, system 101 comprises one or more electronic kiosks as customer modules 103 networked to a master module 105 which maintains a database of books stored in an electronic book storage means (e.g., in a CD ROM jukebox, as will be described hereinafter) in a unique digital, book-description format (as shown in FIG. 5 and as described hereinafter) such that on consumer demand, a single copy of a selected book (including the text pages and a color cover) may be printed via high-speed raster printing engines. The text pages and the cover are then thermally bound into a single copy of the selected book while the consumer waits about three to five minutes.

The electronic kiosks are utilized by the consumer for book browsing and selection which is done via a touch screen while viewing graphical simulations of actual objects and books including covers, flyleaves, table of contents, and elements of the book body. Full motion video and stereo audio programs of background MIDI music and digitized speech and sounds describing the books are also presented in synchronization. The data comprising the graphical simulation and, video and audio program are stored locally within the data storage element of the kiosk thus implementing a local cache component of a distributed, hierarchical storage system when combined with the master module's internal hierarchical storage subsystem. The kiosks are interconnected to the master module via a wireless local area network (LAN) to simplify placement.

It will be understood that while the customer modules or kiosks are preferred, they are not necessary to the operation of the book system 101 of the present invention. In place of the customer modules, a customer may merely tell a clerk operating the master module 105 what book has been selected and the clerk may enter the appropriate code for the book selected to enable the apparatus to retrieve the book from storage and to print and bind the book in the manner described.

The master module maintains a large database of book covers and text bodies stored in a unique, digital book description format specifying all attributes of a standard published book and tailored for high-speed raster printing. Upon selection of a book at a kiosk, a book printing command is sent to the master module which then reads the book data from the master module storage subsystem. The book cover data is sent to a color, raster print engine in synchronization with the book body being sent to high-speed, duplexing, raster print engines. The book cover and body are then combined and moved to an automated, thermal book binder where the book is perfect bound. The master module utilizes a hierarchical storage system consisting of high speed magnetic disk elements and lower speed, CD-ROM optical disk elements. The master module also utilizes a wide area network connection to a larger central database of books from which a book maybe uploaded to the site-based book machine.

The singular nature of this machine differentiates it from other general purpose machines of a similar kind which require routine adjustment and intervention. Other general purpose machines, although capable of document production are not specifically designed to be consumer operated for the on demand, automatic manufacturing of a single book at the point of sale.

System 101 is comprised of two main subsystems, a master module 105 and a customer module 103. A finishing module 107 is considered part of the master module, but it may be located remote for master module 105. More particularly, master module 105 is comprised of a master-client computer 109, a book server computer 111, a printing server computer 113, and a binding server computer 115. Preferably, each of these computers is equipped with not less than 16 Mbytes of program memory, a 1.44 Mbytes 3.5" magnetic diskette drive, and 500 Mbytes of integral magnetic disk storage for the storage of the operating system and application and utility programs. The book server computer 115 also preferably includes a 21 Mbytes floptical disk drive 117 for transferal of a single book from one of the thousands of such books stored in a 650 Mbytes CD-ROM drive 119. A RAID level 5 fault tolerant disk array 121 preferably having a storage capacity of not less than about 2 Gbytes is used for the temporary storage of book data utilizing a least recently used algorithm for book replacement. CD-ROM jukebox 123 of not less than 40 CDs for on-line storage of not less than about 2,000 or more books and as many as about 10,000 books (depending on the length of the books or other publications stored) in a digital book description format, preferably (but not necessarily) in the format described in FIG. 5.

More particularly, the book description format of the present invention, is divided into three portions. First, there is a Book Attributes Description which includes eleven (11) different informational attributes about the book that would help one find common information about the book. These include the title of the book, its ISBN number and other information (as shown in FIG. 5) which help to describe the book and to provide the potential customer about the book. It may also include an abstract of the book. Further, the book format includes information concerning the contents of the book, as listed under the Book Contents Description listed on FIG. 5. Lastly, the book format include the actual contents of the book including its cover and the body of the book which may consist of stored graphical images of the cover and the text pages of the book stored in a bit mapped or raster image format.

It will be appreciated that the Book Attributes and Book Contents Description of the book format of the present invention are separated from the actual content of the book. This allows the attributes of a book to be entered onto the database of the apparatus of the present invention by knowledgeable clerical personnel having the actual printed book in front of them and entering the requested information concerning the book into the data format system. It will be appreciated that this information is stored in a format which is searchable by the master-client computer 109 so that this information may be searched by the apparatus of the present invention. In this manner, all of the Book Attributes, including key words, may be searched at the request of the customer so as to located a book, even when the title, author or other key information is not known to the customer.

Once this information has been entered, the actual contents of the book (i.e., the cover of the book and the actual pages of the book) may be scanned as graphical images and stored in a digital, bit mapped (rasterized) image format. In that manner, after the book is located using the information contained the Book Attributes Description and the Book Contents Description, the actual physical pages of the book which are desired to be printed (either the entire book or only selected pages or chapters of the book) may be readily selected and retrieved from either the RAID disk array 121 or the CD-ROM jukebox 121 and transferred to the printer server computer 113 and then printed as bit mapped or rasterized images by the color laser print engine 147 (for printing the color cover in the exact form of the publisher) or as the book text pages, as printed by the black and white laser printer 149. It will be appreciated that the by sending bitmapped pages to the print engines, that the throughput of the printers is maximized and the entire book can be printed in about 3–5 minutes, depending on the number of pages in the book.

While the graphics of the cover of the selected book may be faithfully reproduced by color printer 147 such that the book manufactured by the apparatus of the present invention will appear to be similar to the book printed by the book publisher, it may not be preferred that the actual color cover be printed. Instead, a color (or even a black and white) cover which is more genetic to such re-published books may be used. Of course, if color covers are not required, the color print engine 147 would not be required.

Another advantage of the book description format of this invention is that it allows the ready selection or either an entire book or only selected parts of one book or from a number of books for compiling anthologies of the same author or different authors. For example, selected chapters from different books with a common author may be combined, or chapters of different authors on common subjects may be combined. Such combined books would have particular application in the education field as teachers could design their own text books by picking and choosing the exact chapters that they may wish to cover in a particular course.

Those skilled in the art will recognize that by storing the book text information in a bit mapped book description format, as above described, several advantages are realized. First, the bit mapped format allows better compression of the data and allows the direct rasterized printing of the bit mapped (or rasterized image) cover and text pagers without having to translate a graphical or word processing format (such as Postscript commercially available from Adobe). This allows for high speed selection of a selected book from a plurality of books in the library. It also allows for high speed raster image (bit mapped) printing. This eliminates the need to translate from another format prior to printing. It also insures that the format of the book, as established by the publisher is maintained when the book is printed using the apparatus of the present invention. This format also allows for ease input of the books into the system not stored in an electronic format because is allows for the pages of the book to be scanned.

CD-ROM Jukebox 123 preferably has not less than a capacity of 40 CD-ROM platters each of a capacity of 650 Mbytes, and a data transfer rate of not less than 700 Mbytes per second for the storage of both book catalog data and book printing data. Book printing data is stored in a unique book description format, optimized for raster printing and specifying all attributes of a standard published book. In accordance with this invention, other storage media and retrieval systems may be used.

All computers 109–115 inter-communicate via an internal Local Area Network (LAN) hub 125 also to which is attached a wireless LAN control module 127 for communication with the customer modules 103, a LAN bridge 129 is provided for high speed receipt of books via a Wide Area Network (WAN) connection from the central book database (e.g., a database of many thousands of books stored on a remote central computer [not shown]) such that publications not stored on CD ROM jukebox 123 may nevertheless be used to select and to print a book. It will be understood that the above-described wide area network may include the public telephone lines and satellite communications. For example, a store having one of the apparatus of the present invention installed therein may call up the host or central computer located remotely from the store via the public telephone network to request a book not stored within the apparatus. Then, the central computer may transmit the book to the store via a satellite down link. A LAN modem 13 1 for access to the public telephone service for book request from the central book database (remote central computer), for credit card transactions, for transmittal of transaction data, and for communication of equipment status.

Also part of the master module 105 is a clerk console 133 which is provided with a super VGA display monitor 135 with touch panel 137, a pair of powered audio speakers 139, an industry standard extended keyboard 141, and a credit card reader 143. The clerk console 133 is used by the clerk to monitor all equipment and to assist in customer transactions. The display monitor with touch panel 31 has a diagonal measurement of not less than 17", with a display resolution of 1024×768 pixels, and a touch panel sensitivity of not less than 1 part in 1024. The powered audio speakers 139 include integral amplifiers of not less than 20 watts

RMS.

The clerk console 133 normally operates in conjunction with the master-client computer 109 in a control and monitor mode. In this mode the clerk can monitor the status of all equipment, can simultaneously assist in customer transactions employing a credit card reader 143 for purchase authorization as needed, and can utilize the extended keyboard 141 to perform standard maintenance and book loading procedures via the floptical drive 117 and the CD-ROM drive 123.

The clerk console 133 can also operate fully as a customer module 103 using customer module application programs executing on the master-client computer 109. The powered audio speakers 139 are utilized for playback of background audio programs while the clerk console is being utilized as a customer module. This mode of operation allows the master module 109 to operate fully as a single copy, high speed book manufacturing system without customer modules 103.

All computers 109–115 share the display monitor 139 and extended keyboard 141 of the clerk console 133 via a 4 to 1 video/keyboard switch 145. The 4 to 1 video / keyboard switch 145 is an electro-mechanical switch with push-button switch operation. Only one computer can utilize the display monitor 135 and keyboard 137. Only the master-client computer 109 utilize the touch panel and credit card reader capabilities The priming server computer 113 controls a color laser printer engine 147 (preferably a Xerox 5775 color laser printer) for printing of a color book cover and a high speed black and white laser printer engine 149 (preferably a Xerox 4090 laser primer) for printing of the book text pages. The color laser printer engine 147 is capable of printing color graphical book covers in a resolution of not less 300 pixels per inch and a printing speed of not less than 6 impressions per minute on paper sizes of 8.5"×5", 8.5"×11", 8.5"×14" and 11"×17" with weights of 17 lb. to 21 lb. bond. The high speed black and white laser printer 149 preferably provides a resolution of not less 300 pixels (i.e., 300 dots per inch) and a printing speed of not less than 90 impressions per minute on paper sizes of 8.5"×5", 8.5"× 11", 8.5"×14" and 11"×17" with weights of 17 lb. to 21 lb. bond.

As indicated at 151, a paper handler receives both the text pages and the color cover printed by printer engines 149 and 147, respectively, and assembles them for binding in a thermal binding machine 153. Preferably, the binding machine is a Bindfast 5 commercially available from Standard Duplicating Equipment Company which must be modified such that it will automatically bind the book upon instruction from the binder server computer 115. Once the book is bound, it is discharged from apparatus for being inspected and given to the customer.

Customer module 103 includes a customer console 155 with a Super VGA display monitor 157 with touch panel 159, a pair of powered audio speakers 161, an industry standard extended keyboard 163, and a credit card reader 165. The customer module also includes a client computer 167 and a wireless Local Area Network user module 169 for network connection to the master module 105. Customer consoles 155 are preferably provided with a customer seat and an ambient light level suitable for viewing the display monitor 157.

The customer module display monitor 157 with touch panel 159 has a diagonal measurement of not less than 17", with a display resolution of 1024×768 pixels, and a touch panel sensitivity of not less than 1 part in 1024. The display monitor with touch panel 159 is used by the customer to browse the book catalog. Graphical simulations of objects and books are displayed in conjunction with promotional material and may be accompanied with full motion video. The simulations are manipulated by the customer and via the integral touch panel. The extended keyboard 163 is not used by the customer but is included for use by field support and maintenance personnel. The credit card reader 165 is used by the customer for unassisted sales authorization. Book manufacture proceeds automatically once a credit card sale is authorized. Cash sales require clerk assistance.

An accompanying stereo audio program of background music and digital sounds may optionally be played via the powered audio speakers 161 in synchronization with the video and graphics Digital sounds may include sounds effects as well as book reviews and other human voice materials. The powered audio speakers 161 include integral amplifiers of not less than 20 watts RMS.

The customer module client computer 167 is equipped with not less than 16 Mbytes of program memory, a 1.44 Mbytes, 3.5" magnetic diskette drive, and 500 Mbytes of integral magnetic disk storage of the operating system, application and utility programs, and of book graphical and other promotional data. The client computer 167 provides control of the display monitor with touch screen 159 as well as of the credit card reader 165, the wireless LAN controller 169, and of the powered audio speakers 161. The interface to the touch screen panel 159 and credit card reader 165 are via RS232 serial interfaces. A MIDI and digital sound adapter is utilized for program control of the powered audio speakers 165. An ethernet adapter card (not shown) is utilized for the interface to the wireless LAN user module 169.

In regard to the embodiment 101 described in FIGS. 3 and 4, operation and data preparation are as follows:

The application software for the master-client microcomputer 109 which resides in the integral hard magnetic disk creates labeled touch pads on the clerk console screen 135, identifies and locates the coordinates of a finger pressure on the touch sensor of clerk console 133 and translates the coordinates into commands that provide for (a) adding new book titles, text and descriptive material data to the disk array 121 or CD-ROM jukebox 119, and transferring subsets of this data to the customer module client computer 167; (b) executing and summarizing purchase transactions from credit card reader 165 or clerk console credit card reader 143 and preparing periodic reports; (c) generating daily reports for publisher royalties; and (d) conducting system health diagnostics on all active elements of the system and displaying the results of these checks on the clerk's console screen.

The application software for the book server computer 109 provides for (a) the receipt and execution of book catalog requests received from customer console microcomputer 167; (b) the retrieval of book titles, graphics and descriptive data from storage in disk array 12 1 or optical disks in CD-ROM 119 in response to commands, and the transfer of same to client computer 155 in customer module 103; (c) the transfer of purchase commands to master-client microcomputer 109; and (d) the execution of diagnostic commands and the transfer of system messages to master-client microcomputer 109.

The application software for the client computer 167, (a) creates labeled touch pads on customer console computer screen 157; (b) identifies and locates the coordinates of a finger pressure on the touch sensor and translates the coordinates into customer commands; (c) transfers commands to bookserver computer 111 and receives commands and data, such as book lists, book text, sales promotional information and graphics, etc., and (d) interprets commands and displays information on color computer display 135.

OPERATION

Book manufacturing system 101 employs three major steps for operation: (a) Initial preparation and storage of source data; (b) process for customer browsing and purchase selection; and (c) physical printing and assembly of selected book.

DATA PREPARATION

The book data that is employed by the system is comprised of three elements: (a) the textual contents of the book, (i.e., text pages, index page, table of contents, Library of Congress notice, fly sheets, etc.); (b) descriptive material such as a synopsis, plot outline, author's biographical summary, etc., (i.e., those textual materials that are promotional in nature); and (c) color cover graphics.

The source of this data will usually be the publisher of the book, and each book is first translated from its source media to a book description format (as shown in FIG. 5) for recording singly on 21 Mbytes floptical disks (as shown in FIG. 3) or in sets on 650 Mbytes CD-ROM. One floptical stores up to 2 books, while a CD-ROM disk can store up to 65 books.

The system employs CD-ROMs disks in a Jukebox 123 as its primary data source, and initially the library of books that the publisher or system owner wishes to be made available to the system must be manually loaded into the jukebox 123. Each CD-ROM disk has the capability of storing up to 65 sets of textual, graphics and descriptive data. The total system capacity is limited only by the number of CD-ROM disks required for a given store. The additional CD-ROM disks not in the CD-ROM jukebox 123 would require operator loading.

Additions to the existing storage library are shipped to system owners via floptical or CD-ROM media. Alternatively, books are delivered on-demand via a high-speed wide area network (WAN) connection, and transferred to either the RAID disk array 121 or to CD-ROM jukebox 123 by the application program in the book server computer 111.

Upon initial system loading of the CD-ROM jukebox 123 and of subsequent additions, utility software in the book server computer 111 creates an index by author and title of all books available in the system, and copies the descriptive material of each book, together with a low-resolution subset of its cover graphics to the storage unit of the client computer 167 of the customer module 103 to provide graphic and descriptive index.

CUSTOMER SELECTION

All customer actions are conducted within customer console 103. The customer seats him or herself in front of computer screen 157 which initially displays a preprogrammed graphics and text message selected by the system owner and invites the customer to touch any part of the screen to initiate the dialogue. For all subsequent customer/system interchanges, the screen will display sets of graphical objects to be manipulated by the customer by means of a series of labeled vertically-oriented command buttons on the right side of the screen, with requested data and graphics being presented in the remaining area of the screen. A "help" command block will be present on each transaction screen to assist the customer in accessing the system, and all text display formats include a touch 'dragging' feature that enables the customer to browse forward and backward through the displayed text at his own pace. A visual feedback is made to each touch and a double tap will "undo" the selection. The transactions available to the customer include, but are not limited to: (a) display of current best sellers, with selection resulting in a display of the book; (b) searching by title or author, with selection resulting in a display of the book; (c) browsing through descriptive material provided by the publisher; (d) making another selection; and (e) requesting purchase of a book.

Each customer console 103 is a stand alone unit with local storage and is a node on a high-speed local area network (LAN) for access to the master module book server computer 111 for graphic, hierarchical storage subsystems, and descriptive catalog data and for requesting a purchase. Application software within master module book server 111 retrieves the graphic or descriptive data requested by a customer console, decompresses the data and routes the data to the requester. Library integrity is maintained by operating the storage subsystem in a read-only mode and by the interlocking of command software such that only logical command sequences are accepted.

Following a purchase command, the customer is advised of the waiting time for delivery of the finished book which usually will be three to five minutes applications software in the master-client computer 109 maintains track of printing status and advises individual customer consoles of the expected time of book delivery.

PRODUCT DELIVERY

A purchase request from customer module 103 results in the clerk being notified by a screen message. Following this action, the clerk may be requested to verify payment prior to initiation of book manufacture. It is contemplated that this step may also be accomplished fully automatically via credit card authorization. Upon cash payment by the customer at the clerks station, or upon credit card payment and verification through credit card readers 165 or 143, book manufacture is initiated.

The applications software resident in the printing server computer 113 accepts a purchase command from the customer module, checks printer status and returns a message to the requester of anticipated delivery time. The purchase command includes title data that is used to format a display to the clerk's screen. Data is then retrieved from book server computer 111, cover data is decompressed and routed to color laser printer 149, and book data is decompressed, ordered and formatted for duplex printing and routed to printer 147.

On completion of the printing operation, binding server computer 115 is signaled and it commands a conveyor to transfer the collated stack of paper text pages to the jogger table within paper handler 15 1 to achieve paper alignment, and then to thermal binder 153 where the paper stack is clamped. The finished cover sheet is transferred from printer 149 is delivered to binder 153 where glue is applied to the paper pages and the cover sheet is creased around the pages and the spine to achieve a finished book. The book is then conveyed out of the finishing module 153 and delivered for pickup.

It will be understood that since as part of the Book

Attributes portion of the book format description format of the present invention, information is provided concerning the publisher, the author and the copyrights, each time a book or portion of a book is reproduced by the apparatus of this invention, proper credit may be give to the publisher or the author such that copyright royalties or other contractual arrangements between the owner of the apparatus and the publisher may be properly calculated.

It will be readily apparent to one skilled in the art that numerous modifications may be made to the preferred embodiment of the invention as described herein above without departing from the spirit and scope of the present invention.

Having thus described the invention, what is claimed is:

1. A book manufacturing system comprising:

computer means for storing data corresponding to the text of and information concerning a plurality of books in a format retrievable by said computer means;

selection means in communication with said computer means for selectively retrieving stored data corresponding to each of such books;

means for high speed printing of the text of a selected one of said books on paper pages upon a signal from said selection means and command from said computer means;

said format describing the cover of the book in a bit mapped color format, and wherein said computer means stores and selectively retrieves data corresponding to the color graphics of the covers of said plurality of books, and color printer means for reproducing the cover graphics of said selected one of said books on suitable cover material upon a signal from said selection means and command from said computer means.

2. A book manufacturing system as specified in claim 1 wherein there is included:

finishing means for automatically binding said paper pages together with said cover therearound to form said selected one of said books.

3. A book manufacturing system as specified in claim 2 wherein:

said selection means is a computer display terminal having a touch sensor screen means for relaying commands to said computer means.

4. A book manufacturing system as specified in claim 2 wherein:

said computer means includes a credit card reader means in communication with the public telephone network for automatically reading information on a credit card, obtaining approval to charge such credit card and charging such credit card for the purchase of a selected one of said books.

5. A book manufacturing system comprising:

computer memory means for storing data corresponding to the text of a plurality of books, and corresponding to cover graphics in a digital format, selection means for selecting portions of such data, computer means for retrieving said selected data in response to a signal from said selection means, means for high speed printing of said selected text data, means for reproducing the selected cover graphics, and finishing means for binding such reproduced text and such cover graphics together.

6. A method of high speed manufacture of a single copy of a book or of a selected portion of one or more books comprising the steps of:

storing the text of a plurality of books in a computer in a bit mapped format, selecting a selected one of said books or a portion of a plurality of said books to be manufactured, commanding a computer to print the text of such selected books, raster image printing said bit mapped text of such selected books on paper pages, binding said paper pages together, and storing graphical information corresponding to a cover for said selected books in a bit mapped format, commanding a computer to reproduce said graphical information on a book cover, and binding said paper pages together with said cover therearound to form said selected one of said books.

7. A method of high speed manufacture of a single copy of a book comprising the steps of:

storing the text of a plurality of books in a computer, storing a plurality of covers for books to be printed in said computer, said covers being stored in a bit mapped format, storing sales information relating to said plurality of books in a computer, providing means for a customer to scan said sales information, enabling the customer to select which book or a portion of a plurality of books, commanding a computer to print the text of said selected books and a cover in response to said selection, retrieving the text of said selected books from a computer, printing the text of said selected books on paper pages, and binding said paper pages together to form said selected one of said books.

8. A method of high speed manufacture of a single copy of a book comprising the steps of:

storing the text of a plurality of books in a computer, storing sales information relating to said plurality of books in a computer, providing means for a customer to visually review said sales information, commanding a computer to print the text of a selected one of said books in response to a customer's selection, retrieving the text of said selected one of said books from a computer, printing the text of said selected one of said books on paper pages, binding said paper pages together to form said selected one of said books, storing graphical information corresponding to the cover of each of said books, commanding a computer to reproduce said graphical information on a book cover, and binding said paper pages together with said cover therearound.

* * * * *

(12) REEXAMINATION CERTIFICATE (4443rd)

United States Patent
Ross (10) Number: US 5,465,213 C1
(45) Certificate Issued: Sep. 18, 2001

(54) SYSTEM AND METHOD OF MANUFACTURING A SINGLE BOOK COPY

(75) Inventor: Harvey M. Ross, St. Louis, MO (US)

(73) Assignee: On Demand Machine Corp., St. Louis, MO (US)

Reexamination Request:
No. 90/004,807, Oct. 20, 1997

Reexamination Certificate for:
Patent No.: 5,465,213
Issued: Nov. 7, 1995
Appl. No.: 08/090,417
Filed: Jul. 12, 1993

Related U.S. Application Data (63) Continuation-in-part of application No. 07/558,759, filed on Jul. 27, 1990, now abandoned.

(51) Int. Cl.$^7$ .................................................. G06F 19/00
(52) U.S. Cl. .................. 700/117; 270/52.02; 270/52.18; 412/13; 705/17
(58) Field of Search ............................... 700/90, 95, 117, 700/231, 232, 234, 241; 235/380, 381; 270/52.01, 52.02, 52.18; 412/13; 705/17

(56) References Cited

U.S. PATENT DOCUMENTS

| | | | |
|---|---|---|---|
| 3,575,501 | 4/1971 | Rosenberg | 399/306 |
| 3,892,427 | 7/1975 | Kraynak et al. | 281/15.1 |
| 4,121,818 | 10/1978 | Riley et al. | 270/52.29 |
| 4,528,643 | 7/1985 | Freeny, Jr. | 380/4 |
| 4,616,327 | 10/1986 | Rosewarive et al. | 345/435 |
| 4,654,799 | 3/1987 | Ogaki et al. | 364/479.04 |
| 4,674,055 | 6/1987 | Ogaki et al. | 364/479.04 |
| 4,725,977 | 2/1988 | Izumi et al. | 711/115 |
| 4,768,766 | 9/1988 | Berger et al. | 270/1.02 |
| 4,787,050 | 11/1988 | Suzuki | 364/479.02 |
| 4,839,829 | 6/1989 | Freedman | 345/329 |
| 4,900,001 | 2/1990 | Capeyre | 270/1.01 |
| 4,903,130 | 2/1990 | Minter | 358/296 |
| 5,036,472 | 7/1991 | Buckley et al. | 364/479.03 |
| 5,144,562 | 9/1992 | Stikkelorum | 364/478.11 |
| 5,164,842 | 11/1992 | Gauronski et al. | 358/401 |

OTHER PUBLICATIONS pub 26, Joint Study in Digital Preservation, Anne Kenney and Lynne Personius, Published Sep. 1992), ISSBN 1–887334–17–3.

The Cornell/Xerox/Commission on Preservation and Access—Joint Study in Digital Preservation Report: Phase I (Jan. 1990–Dec. 1991), Digital Capture, Paper Facsimiles, and Network Access, Anne R. Kenney and Lynne K. Personius, © 1992.

Newsletter Insert, Update on Digital Techniques, Anne R. Kenney and Lynne K. Personius, Nov.–Dec., 1991.

The Cornell/Xerox/Commission on Preservation and Access—Joint Study in Digital Preservation Report: Phase I (Jan. 1990–Dec. 1991), Supplements, ©1992.

Xerox Publishing Systems (XPS) 700 Series, Datapro Research Corp., © 1986.

Interpress, The Source Book, Steven J. Harrington and Robert R. Buckely, © 1988, pp. 280–283, 342–346, 352–355, 371–379, 406, 410, Submitted to the Patent Owner with Tab 33.

Interpress, The Source Book, Steven J. Harrington and Robert R. Buckely, © 1988, pp. 240–243, submitted to the Patent Owner with Tab 35.

Complete copy of Interpress, The Source Book, Steven J. Harrington and Robert R. Buckley, © 1988. The complete book, approx. 500 pages. Submitted separately, not bound in Book of Exhibits due to length. (Submitted separately from Books of Exhibits).

*Primary Examiner*—Paul P. Gordon (57) ABSTRACT

A computer based book manufacturing, distributing and retailing system for the high speed reproduction of a single copy of a book is disclosed. The system is especially adapted for direct consumer sales since the manufacture of a selected book can take place at the point of sale. A master module includes a computer having a database of books to be selected, the books preferably being stored in a digital book-description format. Upon selection of a particular book from the database, a single copy of the book (including the text and a color cover) is printed by means of high speed raster printing engines. The system includes a binder for binding the text pages and the cover into a book.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 7 and 8 is confirmed.

Claims 1–6 are cancelled.

* * * * *

(12) EX PARTE REEXAMINATION CERTIFICATE (8763rd)
United States Patent
Ross (10) Number: US 5,465,213 C2
(45) Certificate Issued: Dec. 13, 2011

(54) SYSTEM AND METHOD FOR MANUFACTURING A SINGLE BOOK COPY

(75) Inventor: Harvey M. Ross, St. Louis, MO (US)

(73) Assignee: On Demand Machine Corp., St. Louis, MO (US)

Reexamination Request:
No. 90/007,589, Jun. 16, 2005

Reexamination Certificate for:
Patent No.: 5,465,213
Issued: Nov. 7, 1995
Appl. No.: 08/090,417
Filed: Jul. 12, 1993

Reexamination Certificate C1 5,465,213 issued Sep. 18, 2001

Related U.S. Application Data

(63) Continuation-in-part of application No. 07/558,759, filed on Jul. 27, 1990, now abandoned.

(51) Int. Cl.
*G07F 17/00* (2006.01)
*G07F 7/00* (2006.01)
*G07F 17/26* (2006.01)
*G06Q 30/00* (2006.01)

(52) U.S. Cl. .................. 700/117; 270/52.02; 270/52.18; 412/13; 705/17

(58) Field of Classification Search .................. 700/117; 412/13
See application file for complete search history.

(56) References Cited

To view the complete listing of prior art documents cited during the proceeding for Reexamination Control Number 90/007,589, please refer to the USPTO's public Patent Application Information Retrieval (PAIR) system under the Display References tab.

*Primary Examiner*—Majid A. Banankhah (57) ABSTRACT

A computer based book manufacturing, distributing and retailing system for the high speed reproduction of a single copy of a book is disclosed. The system is especially adapted for direct consumer sales since the manufacture of a selected book can take place at the point of sale. A master module includes a computer having a database of books to be selected, the books preferably being stored in a digital book-description format. Upon selection of a particular book from the database, a single copy of the book (including the text and a color cover) is printed by means of high speed raster printing engines. The system includes a binder for binding the text pages and the cover into a book.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-6 were previously cancelled.
Claims 7 and 8 are cancelled.

* * * * *